United States Patent Office 3,484,485
Patented Dec. 16, 1969

3,484,485
CYCLOPROPANECARBOXANILIDES
Herbert Schwartz, 27 N. State St.,
Vineland, N.J. 08360
No Drawing. Continuation-in-part of application Ser. No. 535,032, Mar. 17, 1966, which is a continuation-in-part of applications Ser. No. 451,991, Apr. 29, 1965, and Ser. No. 293,863, July 9, 1963. This application June 20, 1967, Ser. No. 647,313
Int. Cl. C07c *103/86;* A01n *9/20*
U.S. Cl. 260—557
9 Claims

ABSTRACT OF THE DISCLOSURE

Novel cyclopropanecarboxanilides of the formula

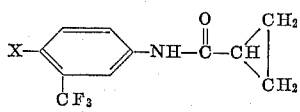

wherein X is selected from the group consisting of —NH$_2$, fluorine, chlorine, bromine and lower alkoxy of 1 to 7 carbon atoms and mono- and di-alkylamino wherein the total number of alkyl carbon atoms is 1 to 20 which have selective pre- and post-emergence herbicidal activity.

PRIOR APPLICATIONS

This application is a continuation-in-part application of my copending U.S. patent application Ser. No. 535,032, filed Mar. 17, 1966, now U.S. Patent No. 3,407,056, which, in turn, is a continuation-in-part application of my U.S. patent applications Ser. No. 451,991, filed Apr. 29, 1965 and Ser. No. 293,863, filed July 9, 1963, both now abandoned.

PRIOR ART

The commercial use of herbicides has only recently begun to reach substantial proportions and a great deal of research has been conducted in this field in the last few years. Anilides substituted directly on the phenyl group are now commercially available. Examples of these compounds are 3′,4′-dichloropropionanilide (Stam), 3′,4′-dichloromethacrylanilide (Dicryl), 3′,4′-dichloro-α-methylvaleranilide (Karsil), and 3′-chloro-4′-methyl-α-methylvaleranilide (Solan). The said halogenated anilides, however, possess only post-emergence herbicidal activity.

OBJECTS OF THE INVENTION

It is an object of the invention to provide the novel cyclopropanecarboxanilides of Formula I.
It is another object of the invention to provide novel pre- and post-emergence methods of killing weeds.
These and other objects and advantages of the invention will become obvious from the following detailed description.

THE INVENTION

The novel cyclopropanecarboxanilides of the invention have the formula

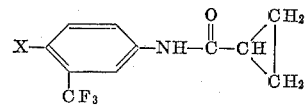

wherein X is selected from the group consisting of —NH$_2$, halogen, lower alkoxy and lower alkylthio of 1 to 7 carbon atoms and mono- and di-alkylamino wherein the total number of alkyl carbon atoms is 1 to 20.

The compounds of Formula I may be prepared in the form of dusting preparations, or solutions, emulsions, dispersions or concentrates depending upon the desired herbicidal method of application. The cyclopropanecarboxanilides of the invention are outstanding for their herbicidal selectivity and the high degree of activity. Depending upon the specific application method, the said compounds are effective herbicides at dosages from 0.25 to 10 pounds, preferably 0.5 to 6.0 pounds, per acre, although higher dosages may be used.

In order to prepare a solution suitable for direct spraying there may be used, for example, a mineral oil fraction of high or medium boiling range, such as diesel oil or kerosene, or coal tar oils, or vegetable or animal oils and also hydrocarbons such as alkylated naphthalenes, or tetrahydronaphthalene, if desired, with the use of xylene mixtures, cyclohexanols, ketones, or chlorinated hydrocarbons, such as tetrachloroethane, trichloroethylene or tri- or tetrachlorobenzenes.

Aqueous preparations suitable for application can be prepared by the addition of water to emulsion concentrates, pastes or wettable powders. As emulsifying or dispersing agents there may be used non-ionic products, for example, condensation products of ethylene oxide with aliphatic alcohols, amines or carboxylic acids containing a hydrocarbon radical having about 10 to 30 carbon atoms, such as a condensation product of octadecyl alcohol with 25 to 30 molecular proportions of ethylene oxide, or of soybean fatty acid with 30 molecular proportions of ethylene oxide or of commercial oleylamine with 15 molecular proportions of ethylene oxide or of dodecylmercaptan with 12 molecular proportions of ethyleneoxide. Among anion active emulsifying agents there may be mentioned the sodium salt of dodecyl alcohol sulfuric acid ester, the sodium salt of docecylbenzene sulfonic acid, the potassium or triethanolamine salt of oleic acid or abietic acid or of a mixture of these acids, or the sodium salt of petroleum-sulfonic acid. As cation-active dispersing agents there may be used, quaternary ammonium compounds, such as cetylpyridinium bromide or di-(hydroxyethyl)-benzyl-dodecylammonium chloride.

For making dusting or scattering preparations, they may be used as solid carriers talcum, kaolin, bentonite, calcium carbonate or calcium phosphate or carbon, cork meal or wood meal or other materials of vegetable origin. The various preparations can be rendered more suitable for the various ways in which they are to be used by the known addition of substances which improve the dispersion, adhesiveness, resistance to rain or penetration capacity of the compositions. As such substances, there may be mentioned fatty acids, resins, glue, casein, or, for example, alginates or the like.

The cyclopropanecarboxanilide herbicidal compositions can also contain herbicides with an oxidizing ion to obtain synergistic herbicidal compositions. Examples of suitable herbicides with an oxidizing ion are dipyridylium salts such as 1,1'-ethylene-2,2'-dipyridylium dibromide (Diquat), 1,1'-dimethyl-4,4'-dipyridylium di(methylsulfate) (Paraquat), etc.; alkali metal and alkaline earth metal nitrate salts such as sodium nitrate, calcium nitrate, etc.; herbicidal arsenical compounds such as monoalkanearsonic acids and lower dialkylarsinic acids such as methanearsonic acid, propanearsonic acid, dibutylarsinic acid, dipropylarsinic acid, cacodylic acid (hydroxydimethylarsine oxide), etc., and their alkali metal, alkaline earth metal and amine salts such as monosodium methanearsonate (MSMA), disodium methanearsonate (DSMA), calcium hydrogen methanearsonate, and amine salts of the said arsonic acid where the amine is ethanolamine, triethanolamine, isopropylamine, tri-isopropanolamine, mixtures of alkylamines having 8 to 14 carbon atoms, etc.

The cyclopropanecarboxanilides of the invention may be prepared by the usual known methods of forming carboxanilides. Preferably, the desired 3-trifluoromethyl-4-X-aniline is reacted with cyclopropanecarboxylic acid chloride or acid anhydride.

Examples of cyclopropanecarboxanilides of the invention are 4'-halo derivatives such as 4'-fluoro-, 4'-chloro- or 4' - bromo-3'-trifluoromethylcyclopropanecarboxanilides; 4'-lower alkoxy derivatives such as 3'-trifluoromethyl-4'-methoxycyclopropanecarboxanilide; 4'-amino derivatives such as 3'-trifluoromethyl-4'-aminocyclopropanecarboxanilide,
3'-trifluoromethyl-4'-dimethylaminocyclopropanecarboxanilide,
3'-trifluoromethyl-4'-diethylaminocyclopropanecarboxanilide,
3'-trifluoromethyl-4'-dipropylaminocyclopropanecarboxanilide,
3'-trifluoromethyl-4'-dibutylaminocyclopropanecarboxanilide,
3'-trifluoromethyl-4'-diisopropylaminocyclopropanecarboxanilide,
3'-trifluoromethyl-4'-tert. butylaminocyclopropanecarboxanilide,
3'-trifluoromethyl-4'-diisoamylaminocyclopropanecarboxanilide,
3'-trifluoromethyl-4'-dihexylaminocyclopropanecarboxanilide,
3'-trifluoromethyl-4'-dioctylaminocyclopropanecarboxanilide,
3'-trifluoromethyl-4'-octadecylaminocyclopropanecarboxanilide,
3'-trifluoromethyl-4'-sec.-butylaminocyclopropanecarboxanilide, etc.

In the following examples there are described several preferred embodiments to illustrate the invention. However, it should be understood that the invention is not intended to be limited to these specific embodiments.

EXAMPLE I

Preparation of 3'-trifluoromethyl-4'-chlorocyclopropanecarboxanilide 3 gm. of cyclopropanecarbonyl chloride was slowly added to a stirred solution of 5 gm. of 4'-chloro-3'-trifluoromethylaniline in 200 ml. of benzene and 15 ml. of pyridine during which the temperature increased somewhat. After half an hour, the temperature began to drop, at which time the mixture was heated to reflux for 4 hours. Then, the solvent was distilled off and the residue was dissolved in ether. The ethereal solution was washed with dilute hydrochloric acid, then water, then aqueous sodium bicarbonate until the wash water was neutral and finally, water. The solution was then dried over anhydrous sodium sulfate and the ether was distilled off. The residue was recrystallized from aqueous methanol to obtain 5 gm. (74.2% yield) of 3'-trifluoromethyl-4'-chlorocyclopropanecarboxanilide in the form of colorless crystals having a melting point of 127–128° C.

Analysis ($C_{11}H_9ClF_3NO$): molecular weight=263.69. Calculated: N, 5.32%. Found: N, 5.21%.

EXAMPLES II–VIII

Using the procedure of Example I, the cyclopropanecarboxanilides of Formula I in Table I were prepared.

TABLE I

| X | Melting Point, ° C. | Percent Nitrogen Calculated | Percent Nitrogen Found |
|---|---|---|---|
| −N(CH$_3$)$_2$ | 114–116 | 10.29 | 10.24 |
| −N(CH$_2$−CH$_3$)$_2$ | 109–110 | 9.33 | 9.35 |
| −N(CH$_2$−CH$_2$−CH$_3$)$_2$ | 113–115 | 8.91 | 8.89 |
| −N(CH$_2$−CH$_2$−CH$_2$−CH$_3$)$_2$ | 112–114 | 8.53 | 8.65 |
| −OCH$_3$ | 112–113 | 5.40 | 5.33 |
| −NH−C(CH$_3$)$_3$ | 121 | 9.33 | 9.46 |
| −N(CH(CH$_3$)$_2$)$_2$ | 122 | 8.91 | 9.02 |

EXAMPLE IX

Selective pre-emergence activity 12 x 12 x 3 inch metal flats were planted with seeds of the desired crops and weeds at a soil depth of approximately one-half inch. Care was employed to use a consistent amount of soil in each flat so as to assure uniform seed germination and subsequent seedling development. Also, to reduce random experimental error, a templet was used to make the seed planting furrows and a uniform number or amount of seeds were placed in each flat. Each experimental chemical was prepared for testing by placing an amount of technical material in a volume of acetone/water to equal the desired application rate in a spray volume equivalent to 40 gallon/acre. Chemical applications were made with a fan-type spray directly to the soil surface. After treatment, all flats were placed in the greenhouse and maintained under ambient conditions.

At the end of twenty-seven days, a phytotoxicity evaluation of each herbicide under test was made. This evaluation included an assessment of plant species killed and an estimation of the vigor and growth of remaining plants that were not killed. The later data are of importance in herbicide screening and evaluation in that satisfactory herbicides need not always kill weeds outright but can reduce their growth and vigor to such an extent that competition with desired crop plant species does not occur. The ratings for vigor are explained beneath Table II, and the herbicidal results are recorded in Table II.

TABLE II

| Chemical | Lbs./A. | Corn V. | Corn Percent K. | Mustard V. | Mustard Percent K. | Lettuce V. | Lettuce Percent K. | Soybean V. | Soybean Percent K. | Peas V. | Peas Percent K. | Cotton V. | Cotton Percent K. | Crabgrass V. | Crabgrass Percent K. | Foxtail grass V. | Foxtail grass Percent K. | Pigweed V. | Pigweed Percent K. | Rice V. | Rice Percent K. | Coffee weed V. | Coffee weed Percent K. |
|---|---|---|---|---|---|---|---|---|---|---|---|---|---|---|---|---|---|---|---|---|---|---|---|
| 3'-trifluoromethyl-4'-chloro-cyclopropanecarboxanilide | 1.0 | 5 | 0 | 3 | 75 | 5 | 0 | 5 | 0 | 5 | 0 | 5 | 0 | 4 | 0 | 5 | 0 | 4 | 25 | 5 | 0 | 5 | 0 |
| | 2.0 | 5 | 0 | 0 | 100 | 0 | 100 | 5 | 0 | 5 | 0 | 4 | 0 | 4 | 30 | 5 | 0 | 3 | 50 | 5 | 0 | 5 | 0 |
| | 4.0 | 3 | 0 | 0 | 100 | 0 | 100 | 4 | 0 | 5 | 0 | 5 | 0 | 0 | 100 | 3 | 80 | 0 | 100 | 4 | 0 | 4 | 20 |
| 3'-trifluoromethyl-4'-diethylamino-cyclopropanecarboxanilide | 1.0 | 5 | 0 | 2 | 20 | 5 | 0 | 5 | 0 | 5 | 0 | 5 | 0 | 5 | 0 | 5 | 0 | 4 | 0 | 5 | 0 | 5 | 0 |
| | 2.0 | 5 | 0 | 0 | 100 | 0 | 100 | 5 | 0 | 5 | 0 | 5 | 0 | 4 | 0 | 5 | 0 | 3 | 10 | 4 | 0 | 5 | 0 |
| | 4.0 | 4 | 0 | 0 | 100 | 0 | 100 | 5 | 0 | 5 | 0 | 5 | 0 | 0 | 100 | 3 | 50 | 0 | 100 | 4 | 0 | 4 | 0 |
| 3'-trifluoromethyl-4'-dibutylamino cyclopropanecarboxanilide | 1.0 | 5 | 0 | 4 | 50 | 4 | 50 | 5 | 0 | 5 | 0 | 5 | 0 | 4 | 10 | 5 | 0 | 3 | 25 | 4 | 0 | 5 | 0 |
| | 2.0 | 5 | 0 | 0 | 100 | 0 | 100 | 5 | 0 | 5 | 0 | 5 | 0 | 3 | 60 | 4 | 10 | 3 | 25 | 4 | 0 | 5 | 0 |
| | 4.0 | 5 | 0 | 3 | 0 | 0 | 0 | 5 | 0 | 5 | 0 | 5 | 0 | 0 | 100 | 5 | 0 | 0 | 100 | 5 | 0 | 4 | 10 |
| 3'-trifluoromethyl-4'-dimethylamino cyclopropanecarboxanilide | 1.0 | 5 | 0 | 3 | 30 | 4 | 50 | 5 | 0 | 5 | 0 | 5 | 0 | 4 | 50 | 5 | 0 | 4 | 10 | 5 | 0 | 5 | 0 |
| | 2.0 | 5 | 0 | 0 | 100 | 0 | 100 | 5 | 0 | 5 | 0 | 5 | 0 | 2 | 70 | 2 | 50 | 4 | 70 | 3 | 0 | 5 | 0 |
| | 4.0 | 5 | 0 | 0 | 60 | 0 | 40 | 5 | 0 | 5 | 0 | 5 | 0 | 0 | 0 | 5 | 0 | 2 | 0 | 5 | 0 | 5 | 0 |
| 3'-trifluoromethyl-4'-dipropylamino-cyclopropanecarboxanilide | 1.0 | 5 | 0 | 3 | 100 | 0 | 100 | 4 | 10 | 5 | 0 | 4 | 0 | 4 | 20 | 5 | 40 | 4 | 100 | 4 | 0 | 4 | 100 |
| | 2.0 | 4 | 0 | 0 | 100 | 0 | 100 | 0 | 100 | 0 | 100 | 5 | 0 | 0 | 100 | 0 | 100 | 0 | 100 | 0 | 100 | 0 | 100 |
| 1,1-dimethyl-3-(3-trifluoromethyl-phenyl) urea | 1.0 | 2 | 50 | 0 | 100 | 0 | 100 | 0 | 100 | 0 | 100 | 3 | 25 | 0 | 100 | 0 | 100 | 0 | 100 | 0 | 100 | 0 | 100 |
| | 2.0 | 2 | 50 | 0 | 100 | 0 | 100 | 0 | 100 | 0 | 100 | 3 | 25 | 0 | 100 | 0 | 100 | 0 | 100 | 0 | 100 | 0 | 100 |
| | 4.0 | 2 | 100 | 0 | 100 | 0 | 100 | 0 | 100 | 0 | 100 | 3 | 50 | 1 | 100 | 0 | 100 | 0 | 100 | 0 | 100 | 0 | 100 |
| Untreated | | 5 | 0 | 5 | 0 | 5 | 0 | 5 | 0 | 5 | 0 | 5 | 0 | 5 | 0 | 5 | 0 | 5 | 0 | 5 | 0 | 5 | 0 |

V Rating System:
5=normal; 4=slight injury; 3=moderate injury; 2=moderate-severe; plants not expected to recover; 1=severe, plants will not recover.
Percent kill:
Kill based on percentage.

As can be seen from Table II, the novel compounds of the invention are safe to such commercial crops as corn, soybeans, peas, cotton, rice but toxic to plants such as mustard, crab grass, lettuce and pigweed, while 1,1-dimethyl-3-trifluoro-m-tolylurea (Cotoran) is toxic to every species and shows no selectivity.

EXAMPLE X

Selective post-emergence herbicidal activity

To demonstrate the post-emergence herbicidal activity of the 3'-trifluoromethylcyclopropanecarboxanilides when applied as foliar sprays, some of the compounds listed in Table I were examined on a variety of crop plants and weed species using the following procedure:

Metal flats were seeded to test plant species in the same manner as described previously for pre-emergence evaluation. The experimental chemicals were again prepared for testing in an acetone/water carrier. Spray application was made 17 days after planting of the seeds and at a time when most plant species had attained aerial growth beyond the cotyledons. Treated flats were removed to the greenhouse and maintained under ambient conditions. Daily observance indicated the course of and type of phytotoxicity responses. Final herbicidal evaluation was made when growth recovery was noted on plant species not killed by the treatments. Data describing plant kill and the vigor of remaining plants were recorded as outlined earlier. The results of these tests are given in Table III.

TABLE III

| Chemical | Lbs./A. | Corn V | Corn Percent K. | Mustard V | Mustard Percent K. | Lettuce V | Lettuce Percent K. | Soybean V | Soybean Percent K. | Peas V | Peas Percent K. | Cotton V | Cotton Percent K. | Crabgrass V | Crabgrass Percent K. | Foxtail grass V | Foxtail grass Percent K. | Pigweed V | Pigweed Percent K. | Rice V | Rice Percent K. | Coffee weed V | Coffee weed Percent K. |
|---|---|---|---|---|---|---|---|---|---|---|---|---|---|---|---|---|---|---|---|---|---|---|---|
| 3'-trifluoromethyl-4'-diethylamino cyclopropanecarboxanilide | 0.5 | 4 | 0 | 3 | 0 | 0 | 100 | 3 | 50 | 5 | 0 | 5 | 0 | 5 | 0 | 5 | 0 | 5 | 0 | 4 | 0 | 4 | 0 |
|  | 1.0 | 4 | 0 | 2 | 60 | 0 | 100 | 2 | 70 | 4 | 0 | 3 | 25 | 4 | 0 | 4 | 10 | 3 | 10 | 3 | 0 | 4 | 10 |
|  | 2.0 | 5 | 0 | 2 | 100 | 2 | 100 | 1 | 95 | 4 | 0 | 3 | 60 | 3 | 0 | 3 | 25 | 3 | 25 | 3 | 0 | 4 | 75 |
| 3'-trifluoromethyl-4'-chloro-cyclopropanecarboxanilide | 0.5 | 4 | 0 | 2 | 60 | 0 | 95 | 2 | 50 | 5 | 0 | 5 | 0 | 4 | 75 | 4 | 75 | 4 | 50 | 3 | 20 | 4 | 0 |
|  | 1.0 | 4 | 0 | 0 | 100 | 1 | 100 | 1 | 95 | 4 | 0 | 4 | 0 | 0 | 100 | 3 | 75 | 0 | 100 | 2 | 80 | 4 | 0 |
|  | 2.0 | 5 | 0 | 1 | 100 | 0 | 100 | 1 | 95 | 3 | 0 | 4 | 0 | 4 | 50 | 2 | 0 | 3 | 25 | 3 | 0 | 4 | 50 |
| 3'-trifluoromethyl-4'-dibutylamino cyclopropanecarboxanilide | 0.5 | 4 | 0 | 0 | 75 | 0 | 95 | 2 | 75 | 5 | 0 | 5 | 0 | 2 | 50 | 4 | 50 | 0 | 75 | 3 | 10 | 3 | 0 |
|  | 1.0 | 4 | 0 | 5 | 100 | 0 | 100 | 2 | 75 | 5 | 0 | 3 | 0 | 1 | 95 | 3 | 95 | 2 | 100 | 3 | 85 | 3 | 50 |
|  | 2.0 | 4 | 0 | 4 | 100 | 3 | 100 | 4 | 75 | 4 | 0 | 4 | 0 | 5 | 0 | 5 | 0 | 0 | 0 | 5 | 0 | 5 | 50 |
| 3'-trifluoromethyl-4'-dimethylamino cyclopropanecarboxanilide | 0.5 | 5 | 0 | 3 | 0 | 0 | 30 | 4 | 0 | 5 | 0 | 3 | 0 | 4 | 0 | 4 | 0 | 4 | 25 | 3 | 0 | 4 | 0 |
|  | 1.0 | 4 | 0 | 0 | 60 | 0 | 100 | 1 | 30 | 4 | 0 | 5 | 0 | 4 | 0 | 5 | 0 | 4 | 25 | 3 | 0 | 3 | 60 |
|  | 2.0 | 5 | 0 | 0 | 95 | 0 | 100 | 1 | 95 | 4 | 0 | 3 | 0 | 4 | 0 | 4 | 0 | 4 | 40 | 3 | 10 | 4 | 25 |
| 3'-trifluoromethyl-4'-dipropylamino cyclopropanecarboxanilide | 0.5 | 5 | 0 | 0 | 100 | 0 | 100 | 3 | 50 | 4 | 0 | 5 | 0 | 0 | 100 | 3 | 25 | 3 | 100 | 3 | 10 | 4 | 25 |
|  | 1.0 | 5 | 0 | 0 | 100 | 0 | 100 | 1 | 80 | 5 | 0 | 5 | 0 | 0 | 100 | 3 | 90 | 0 | 100 | 3 | 0 | 4 | 30 |
|  | 2.0 | 3 | 0 | 0 | 100 | 0 | 100 | 3 | 90 | 4 | 0 | 5 | 0 | 0 | 100 | 3 | 0 | 0 | 100 | 3 | 0 | 3 | 80 |
| 1,1-dimethyl-3-(trifluoromethylphenyl) urea | 0.5 | 4 | 0 | 0 | 100 | 0 | 100 | 0 | 100 | 3 | 25 | 5 | 0 | 0 | 100 | 3 | 50 | 0 | 100 | 3 | 25 | 3 | 60 |
|  | 1.0 | 3 | 0 | 0 | 100 | 0 | 100 | 0 | 100 | 2 | 80 | 4 | 0 | 0 | 100 | 3 | 100 | 0 | 100 | 1 | 60 | 3 | 100 |
|  | 2.0 | 4 | 50 | 0 | 100 | 0 | 100 | 2 | 80 | 1 | 0 | 4 | 0 | 0 | 25 | 0 | 50 | 4 | 25 | 3 | 60 | 4 | 50 |
| 3',4'-dichlorocyclopropanecarboxanilide | 0.5 | 4 | 0 | 0 | 100 | 0 | 100 | 0 | 100 | 5 | 0 | 0 | 50 | 4 | 75 | 4 | 90 | 0 | 50 | 3 | 85 | 3 | 50 |
|  | 1.0 | 4 | 55 | 0 | 100 | 0 | 100 | 0 | 100 | 4 | 0 | 0 | 100 | 3 | 100 | 0 | 100 | 5 | 100 | 3 | 95 | 3 | 75 |
|  | 2.0 | 4 | 95 | 0 | 100 | 0 | 100 | 0 | 100 | 4 | 0 | 0 | 100 | 3 | 100 | 0 | 100 | 5 | 100 | 3 | 95 | 3 | 75 |
| Check | | 5 | 0 | 5 | 0 | 5 | 0 | 5 | 0 | 5 | 0 | 5 | 0 | 5 | 0 | 5 | 0 | 5 | 0 | 5 | 0 | 5 | 0 |

V Rating System:
5=normal; 4=slight injury; 3=moderate injury; 2=moderate-severe, plants not expected to recover; 1=severe, plants will not recover.
Percent kill:
Kill based on percentage.

The data of Table III shows that the compounds of the invention when used post-emergence are safe to such commercial crops such as corn, rice, cotton and peas, while Clobber (3',4'-dichlorocyclopropanecarboxanilide) is toxic to corn, cotton and peas and Cotoran (1,1-dimethyl-3-trifluoromethylphenylurea) is toxic to corn, rice and peas.

EXAMPLE XI

The following test was conducted to demonstrate the criticality of the presence of the para substituents on the phenyl ring and the 3-trifluoromethyl group to obtain good herbicidal selectivity and activity.

Flats (11 x 13 inches) were planted with the desired crops to a depth of approximately one-half inch and care was employed in using a consistent amount of soil in the bottom of the flats, in the use of a templet in the marking of the seed rows, in the amount of seeds used, and particularly in the amount of soil placed on top of the seeds in the interest of uniformity from day to day and test to test. The chemicals were prepared as 25% wettable powders with 75% of a pre-mix consisting of 92% by weight of Hi-Sil 232 (a hydrated silica pigment), 4% by weight of Maraspense-N (a lignosulfonate) and 4% by weight of Pluronic L61 (an ethyleneoxide-propyleneoxide condensate). The concentrates were diluted with water to the desired dosage and 250 ml. of such a suspension were uniformly distributed over each flat. The flats were immediately transferred to the greenhouse and were covered for a period of three days so that additional watering was not required until some of the plants had begun to make their appearance above ground. When it was assured that all emergence had occurred, as determined by the check, emergence counts were made on all crops. At the end of 14 to 16 days, a phytotoxicity reading was made on the various crops indicating the extent of damage not only by the stand of the emerged seedings. Phytotoxicity data were recorded on a scale of 0 to 10 in which 0 indicates no injury to the other extreme where 10 indicates that the plants were killed. The results are set forth in Table IV.

TABLE IV.—PRE-EMERGENCE HERBICIDE

| Chemical | Dose, lbs./A. | Variable | Beet | Tomato | Radish | J. grass | Oat | Wheat | Cotton |
|---|---|---|---|---|---|---|---|---|---|
| 3'-trifluoromethylcyclopropanecarboxanilide | 10 | Percent emerg | 8 | 56 | 92 | 58 | 100 | 96 | 75 |
|  |  | P.R. | 10 | 9 | 9 | 2 | 1i | 1i | 0 |
| 3'-trifluoromethylcyclobutanecarboxanilide | 10 | Percent emerg | 88 | 84 | 72 | 58 | 92 | 96 | 75 |
|  |  | P.R. | 0 | 0 | 0 | 0 | 0 | 0 | 0 |
| 3',4'-dichlorocyclopropanecarboxanilide | 10 | Percent emerg | 60 | 68 | 92 | 88 | 68 | 60 | 48 |
|  |  | P.R. | 9+ | 10 | 10 | 9 | 8 | 5 | 8 |
| 4'-chloro-3'-trifluoromethylcyclobutanecarboxanilide | 10 | Percent emerg | 80 | 72 | 88 | 14 | 80 | 92 | 65 |
|  |  | P.R. | 1 | 3 | 2 | 0 | 1 | 1 | 0 |
| 4'-chloro-3'-trifluoromethylcyclopropanecarboxanilide | 10 | Percent emerg | 44 | 56 | 72 | 22 | 84 | 92 | 80 |
|  |  | P.R. | 10 | 10 | 10 | 9 | 9 | 5 | 0 |

Table IV shows that the 3'-trifluoromethylcyclobutanecarboxanilides have little or no activity with or without a para substituent while 3'-trifluoromethylcyclopropanecarboxanilide (no para substituent) has a low degree of herbicidal activity, particularly on grasses such as Johnson grass. The substitution of the 3-trifluoromethyl group for the 3-chloro of Clobber makes the compounds safe for use as a cotton herbicide.

EXAMPLE XII

The compounds listed in Table I were applied to a variety of different plants according to the following procedure. The compounds were prepared as 10% emulsion concentrates in the following solvent system.

Formula 50M:                              Percent by weight
  Compound _____ 10
  Triton X–161 _____ 10
  Solvent 50M _____ 80

Triton X–161 is a blend of anionic and nonionic alkyl aryl polyether alcohols and organic sulfonates. Solvent 50M is a 20:80 by volume mixture of ethyl acetate and Velsicol AR50 (methylated naphthalenes). Before application, the concentrates were diluted to the desired concentration of the compound being tested with water. The crops to be tested had been planted in flats 17 days before the tests and were well established seedlings. The plants were sprayed by a precision turntable technique in which 30 ml. of the spray solution was applied to each flat containing the crops. The plants were then kept under constant daily surveillance for a period of 25 days. The final phytotoxicity data were recorded at the end of 25 days and the plants were scored for phytotoxicity ratings on a scale from 0 (no injury to plants), to 10 (all the plants were killed). The results of the tests are summarized in Table V.

I claim:
1. A compound of the formula

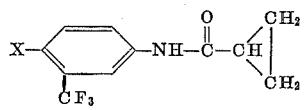

wherein X is selected from the group consisting of $NH_2$, fluorine, chlorine, bromine and lower alkoxy of 1 to 7 carbon atoms and dialkylamino having 1 to 8 carbons in each alkyl moiety and alkylamino of 1 to 18 carbons.

2. 3' - trifluoromethyl - 4' - chlorocyclopropanecarboxanilide.
3. 3' - trifluoromethyl-4'-methoxycyclopropanecarboxanilide.
4. 3' - trifluoromethyl-4'-dimethylaminocyclopropanecarboxanilide.
5. 3' - trifluoromethyl - 4'-diethylaminocyclopropanecarboxanilide.
6. 3' - trifluoromethyl-4'-dipropylaminocyclopropanecarboxanilide.
7. 3' - trifluoromethyl - 4'-dibutylaminocyclopropanecarboxanilide.
8. 3' - trifluoromethyl-4'-tert.-butylaminocyclopropanecarboxanilide.
9. 3' - trifluoromethyl - 4'-diisopropylaminocyclopropanecarboxanilide.

TABLE V.—POST-EMERGENCE HERBICIDE

| Chemical | Dose, lbs./A | Beet | Tomato | Rad. | Oat | Wheat | Cuks | J. grass | Soybean | R.K. bean | Cotton |
|---|---|---|---|---|---|---|---|---|---|---|---|
| 3'-trifluoromethylcyclopropanecarboxanilide | 2 | 10 | 8 | 9+ | 3 | 9+ | 10 | 10 | 4 | 10 | 2 |
| 3'-trifluoromethylcyclobutanecarboxanilide | 2 | 0 | 2i | 3i | 0 | 0 | 5 | 2 | 3 | 1 | 0 |
| 3',4'-dichlorocyclopropanecarboxanilide | 2 | 10 | 10 | 10 | 10 | 10 | 10 | 10 | 10 | 10 | 10 |
| 4'-chloro-3'-trifluoromethylcyclobutanecarboxanilide | 2 | 9 | 7 | 3 | 3 | 1 | 9 | 4 | 4 | 9 | 2 |
| 4'-chloro-3'-trifluoromethylcyclopropanecarboxanilide | 2 | 10 | 10 | 10 | 9 | 7 | 10 | 10 | 8 | 10 | 0 |

Table V clearly demonstrates the critical nature of the compounds of the invention to obtain a high degree of post-emergence herbicidal activity and desirable herbicidal selectivity for use as a herbicide in cotton fields.

Various modifications of the compositions of the invention may be made without departing from the spirit or scope thereof and it is to be understood that the invention is to be limited only as defined in the appended claims.

References Cited

UNITED STATES PATENTS 3,360,432   12/1967   Newallis et al. _____ 260—557

HENRY R. JILES, Primary Examiner

HARRY I. MOATZ, Assistant Examiner

U.S. Cl. X.R.

260—575, 577, 578; 424—342